United States Patent
Baumgarte et al.

(10) Patent No.: US 11,665,151 B2
(45) Date of Patent: *May 30, 2023

(54) UTILIZING CAVEATS FOR WIRELESS CREDENTIAL ACCESS

(71) Applicant: Schlage Lock Company LLC, Carmel, IN (US)

(72) Inventors: Joseph W. Baumgarte, Carmel, IN (US); Keith R. Broerman, Loveland, OH (US); Seth Kaufman, Denver, CO (US); Dennis T. Anfield, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/103,324

(22) Filed: Nov. 24, 2020

(65) Prior Publication Data

US 2021/0288955 A1    Sep. 16, 2021

Related U.S. Application Data

(63) Continuation of application No. 15/975,148, filed on May 9, 2018, now Pat. No. 10,848,477.

(51) Int. Cl.
*H04L 29/06* (2006.01)
*H04L 9/40* (2022.01)
(Continued)

(52) U.S. Cl.
CPC .......... *H04L 63/0807* (2013.01); *G06F 21/44* (2013.01); *H04L 9/3228* (2013.01); *H04L 9/3242* (2013.01); *H04L 63/0853* (2013.01)

(58) Field of Classification Search
CPC . H04L 63/0807; H04L 9/3228; H04L 9/3242; H04L 63/0853; H04L 63/10;
(Continued)

(56) References Cited

U.S. PATENT DOCUMENTS 6,920,559 B1    7/2005   Nesselt et al.
8,266,245 B1    9/2012   Saviano et al.
(Continued)

FOREIGN PATENT DOCUMENTS

WO    2017131887 A1    8/2017
WO    2017132136 A1    8/2017

OTHER PUBLICATIONS

Extended European Search Report; European Patent Office; European Patent Application No. 19275065.1, dated Sep. 23, 2019; 13 pages.
(Continued)

*Primary Examiner* — Malcolm Cribbs
(74) *Attorney, Agent, or Firm* — Taft Stettinius & Hollister LLP

(57) ABSTRACT

A method according to one embodiment includes receiving, by an access control device, a credential token from a mobile device, wherein the credential token includes an access credential, a credential identifier, and a caveat that instructs the access control device to perform an associated action, determining, by the access control device, a credential type associated with the access credential based on the credential identifier, determining, by the access control device, a set of caveat rules associated with the credential type, wherein the set of caveat rules identifies one or more actions authorized for an access credential of the credential type, and performing, by the access control device, the associated action identified by the caveat in response to a determination that the associated action is an action authorized by the set of caveat rules associated with the credential type.

19 Claims, 5 Drawing Sheets

(51) Int. Cl.
*G06F 21/44* (2013.01)
*H04L 9/32* (2006.01)

(58) Field of Classification Search
CPC .......... G06F 21/44; G06F 21/60; G06F 21/62; G06F 21/6209; G06F 21/6218; G06F 21/629
See application file for complete search history.

(56) References Cited

U.S. PATENT DOCUMENTS

| | | |
|---|---|---|
| 9,397,990 B1 | 7/2016 | Taly et al. |
| 9,503,442 B1 | 11/2016 | Griffin et al. |
| 9,602,508 B1 | 3/2017 | Mahaffey et al. |
| 2004/0083370 A1 | 4/2004 | de Jong |
| 2006/0117016 A1 | 6/2006 | Smith et al. |
| 2012/0096272 A1 | 4/2012 | Jasper et al. |
| 2013/0269020 A1 | 10/2013 | Griffin et al. |
| 2014/0052998 A1 | 2/2014 | Bloom et al. |
| 2014/0237236 A1 | 8/2014 | Kalinichenko et al. |
| 2015/0347729 A1 | 12/2015 | Eberwine et al. |
| 2016/0275741 A1 | 9/2016 | Carstens et al. |
| 2016/0292461 A1 | 10/2016 | Yan et al. |
| 2017/0180384 A1 | 6/2017 | Malenfant et al. |
| 2017/0214664 A1 | 7/2017 | Birgisson et al. |
| 2017/0223005 A1* | 8/2017 | Birgisson .............. H04L 63/083 |
| 2017/0345236 A1* | 11/2017 | Kuenzi ............... H04W 12/069 |
| 2018/0262510 A1 | 9/2018 | Su |
| 2018/0359238 A1 | 12/2018 | Appiah et al. |
| 2018/0367306 A1 | 12/2018 | Bahety et al. |
| 2018/0367524 A1 | 12/2018 | Ji et al. |
| 2019/0007212 A1 | 1/2019 | Neve de Mevergnies et al. |
| 2019/0229922 A1 | 7/2019 | Galloway |

OTHER PUBLICATIONS

Amar Birgisson et al.; Macaroons: Cookies with Contextual Caveats for Decentralized Authorization in the Cloud; Proceedings 2014 Network and Distributed System Security Symposium; Jan. 1, 2014; 16 pages.

Ankur Taly; Practical Distributed Authorization; International School on Foundations of Security Analysis and Design; Sep. 2, 2016; 145 pages.

* cited by examiner

UTILIZING CAVEATS FOR WIRELESS CREDENTIAL ACCESS

CROSS-REFERENCE TO RELATED APPLICATIONS

The present application is a continuation of U.S. patent application Ser. No. 15/975,148 filed May 9, 2018 and issued as U.S. Pat. No. 10,848,477, the contents of which are incorporated herein by reference in their entirety.

BACKGROUND

Access control systems typically involve the use of credentials to manage the operation of an access control device (e.g., an electronic lock device). Such credentials may be assigned to a particular user or device and are often physical in nature, forming at least a portion of, for example, a smartcard, proximity card, key fob, token device, or mobile device. Thus, credential systems generally require an interaction between the credential and a reader device (e.g., on or secured to the access control device) such that the reader device may read the credential and determine whether access should be granted. In particular, a user may be required to swipe, tap, or otherwise present the credential to the reader device.

Access control systems using electronic credentials (e.g., stored by a mobile device) typically rely on a wireless communication connection between the mobile device and the credential management system to transmit a current credential for performing an action using an access control device. Such access control systems encounter difficulties when an offline electronic lock and/or offline mobile device is introduced to the system. For example, a commercial building may include a basement or facility that restricts or physically prevents access by outside communication signals, thereby preventing a mobile device from communicating with the credential management system while in the vicinity of a particular electronic lock device.

SUMMARY

According to an embodiment, a method for utilizing caveats for wireless credential access may include receiving, by an access control device, a credential token from a mobile device, wherein the credential token includes an access credential, a credential identifier, and a caveat that instructs the access control device to perform an associated action, determining, by the access control device, a credential type associated with the access credential based on the credential identifier, determining, by the access control device, a set of caveat rules associated with the credential type, wherein the set of caveat rules identifies one or more actions authorized for an access credential of the credential type, and performing, by the access control device, the associated action identified by the caveat in response to a determination that the associated action is an action authorized by the set of caveat rules associated with the credential type.

In some embodiments, the method may further include ignoring, by the access control device, the caveat in response to a determination that the associated action is an action not authorized by the set of caveat rules associated with the credential type.

In some embodiments, the method may further include validating the caveat based on a keyed hash included in the credential token, wherein the keyed hash is keyed by a static key stored on the access control device if the access credential is a first credential type, and wherein the keyed hash is keyed by a second keyed hash included in the credential token and associated with the access credential if the access credential is a second credential type.

In some embodiments, the static key may be a site key stored on the access control device and a host server, and the site key may be inaccessible to the mobile device.

In some embodiments, the access control device may be an offline electronic lock device.

In some embodiments, the credential token may further include a user code, and determining the credential type may include determining the credential type associated with the access credential based on the credential identifier and the user code.

In some embodiments, an access credential having a first credential identifier and a first user code may be determined to be of a first credential type, and an access credential having the first credential identifier and a second user code may be determined to be of a second credential type.

In some embodiments, determining the credential type may include comparing the credential identifier to an access control database of the access control device.

In some embodiments, determining the credential type may include determining the access credential to be one of a normal credential, a toggle credential, a freeze credential, a pass-through credential, or a one-time use credential.

In some embodiments, a first set of caveat rules associated with the normal credential may identify no additional authorized actions for the corresponding access credential, a second set of caveat rules associated with the toggle credential may identify no additional authorized actions for the corresponding access credential, a third set of caveat rules associated with the freeze credential may authorize a lockdown action by the corresponding access credential, a fourth set of caveat rules associated with the pass-through credential may authorize an add user action, a remove user action, a modify permissions action, a wireless call-in action, a calibrate sensors action, a lockdown action, a toggle action, and a run diagnostics action by the corresponding access credential, and a fifth set of caveat rules associated with the one-time use credential may authorize an add user action, a remove user action, and a modify permissions action by the corresponding access credential.

According to another embodiment, an access control device for utilizing caveats for wireless credential access may include a processor and a memory comprising an access control database and a plurality of instructions stored thereon that, in response to execution by the processor, causes the access control device to receive a credential token from a mobile device, wherein the credential token includes an access credential, a credential identifier, and a caveat that instructs the access control device to perform an associated action, determine a credential type associated with the access credential based on the credential identifier, determine a set of caveat rules associated with the credential type, wherein the set of caveat rules identifies one or more actions authorized for an access credential of the credential type, and perform the associated action identified by the caveat in response to a determination that the associated action is an action authorized by the set of caveat rules associated with the credential type.

In some embodiments, the plurality of instructions may further cause the access control device to ignore the caveat in response to a determination that the associated action is an action not authorized by the set of caveat rules associated with the credential type.

In some embodiments, the plurality of instructions may further cause the access control device to validate the caveat based on a keyed hash included in the credential token, the keyed hash may be keyed by a static key stored on the access control device if the access credential is a first credential type, and the keyed hash may be keyed by a second keyed hash included in the credential token and associated with the access credential if the access credential is a second credential type.

In some embodiments, the static key may be a site key stored on the access control device and a host server, and the site key may be inaccessible to the mobile device.

In some embodiments, the access control device may be an offline electronic lock device.

In some embodiments, the credential token may further include a user code, wherein determining the credential type may include determining the credential type associated with the access credential based on the credential identifier and the user, an access credential having a first credential identifier and a first user code may be determined to be of a first credential type, and an access credential having the first credential identifier and a second user code may be determined to be of a second credential type.

According to yet another embodiment, an access control system may include a mobile device, a host server configured to receive an access credential from a credential server and transmit the access credential to the mobile device, and an access control device comprising a memory having an access control database stored thereon, wherein the access control device is configured to update the access control database based on access control data received from the host server, wherein the access control data identifies the access credential and a corresponding credential identifier, receive a credential token from the mobile device, wherein the credential token includes the access credential, the credential identifier, and a caveat that instructs the access control device to perform an associated action, determine a credential type associated with the access credential based on the credential identifier, determine a set of caveat rules associated with the credential type, wherein the set of caveat rules identifies one or more actions authorized for an access credential of the credential type, and perform the associated action identified by the caveat in response to a determination that the associated action is an action authorized by the set of caveat rules associated with the credential type.

In some embodiments, the access control device may be an offline electronic lock device.

In some embodiments, the access control device may be configured to ignore the caveat in response to a determination that the associated action is an action not authorized by the set of caveat rules associated with the credential type.

In some embodiments, the access control device may be configured to validate the caveat based on a keyed hash included in the credential token, the keyed hash may be keyed by a site key stored on the access control device if the access credential is a first credential type, the keyed hash may be keyed by a second keyed hash included in the credential token and associated with the access credential if the access credential is a second credential type, and the site key may also be stored on the host server and inaccessible to the mobile device.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
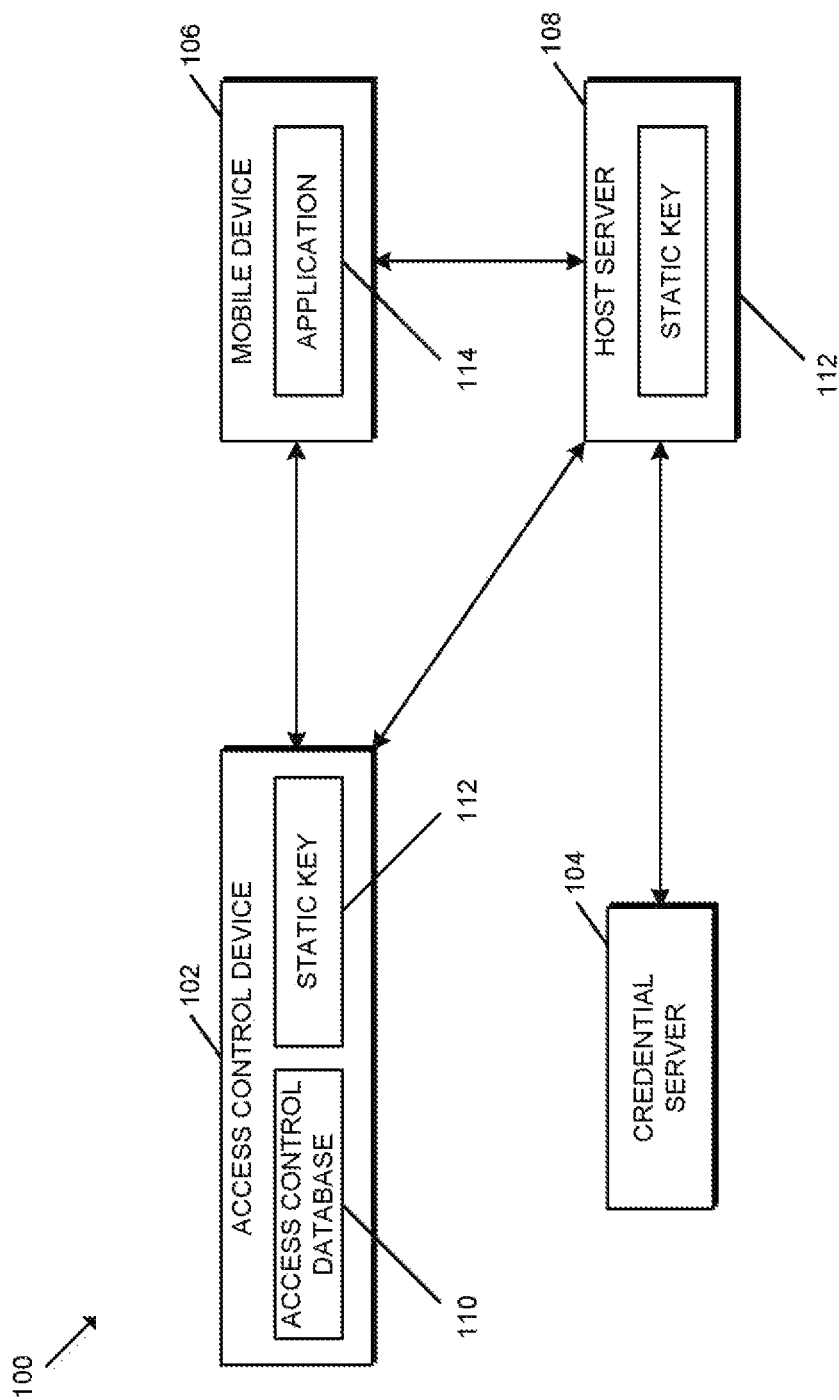
FIG. 1 is a simplified block diagram of at least one embodiment of an access control system for utilizing caveats for wireless credential access.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 for utilizing caveats for wireless credential access includes an access control device 102, a credential server 104, a mobile device 106, and a host server 108.

As described in detail below, in the illustrative embodiment, the access control system 100 utilizes caveats to provide varying levels of security associated with the credential type(s) programmed into the access control device 102. For example, an administrative credential such as a "pass-through" credential (e.g., used by the mobile device 106) may have "super user" rights to perform various actions with respect to the access control device 102. Further, in some embodiments, the user of the mobile device 106 may select the particular action that the user desired to perform from an application 114 executing on the mobile device 106, and the application 114 may add an appropriate caveat to the access credential to authorize such action. It should be appreciated that, in such embodiments, security is fundamentally derived from the initial programming of that credential as an administrative credential. Further, the access control system 100 may also utilize one-time credentials with caveats to securely transfer information to the access control device 102 to perform an associated action while preventing/limiting the possibility of replay attacks and allowing hosts/OEMs to manage their population of access control devices 102 in a secure way without subsequent reliance on the credential server 104 that issued the credentials (e.g., an electronic lock manufacturer). In other words, by utilizing caveats, the access control system 100 provides for secondary credentials that leverage the security of the initial credential issued from the credential server 104. Further, the technologies described herein prevent the addition of caveats that exceed the perceived authority of the associated credential.

It should be appreciated that the access control device 102, the credential server 104, the mobile device 106, and/or the host server 108 may be embodied as any type of device or collection of devices suitable for performing the functions described herein. More specifically, in the illustrative embodiment, the access control device 102 may be embodied as any type of device capable of controlling access through a passageway. For example, in various embodiments, the access control device 102 may be embodied as an electronic lock having a lock mechanism (e.g., a mortise lock mechanism, a cylindrical lock mechanism, a tubular lock mechanism, a latching mechanism, and/or a deadbolt mechanism) or as a peripheral controller of a passageway. Depending on the particular embodiment, the access control device 102 may include a credential reader or be electrically/communicatively coupled to a credential reader configured to communicate with the mobile device 106 and/or other credential-bearing devices. In some embodiments, the access control device 102 is embodied as an offline access control device (e.g., an offline electronic lock device).

As shown in FIG. 1 and described in further detail below, the access control device 102 includes an access control database 110 and a static key 112. In the illustrative embodiment, the access control database 110 may include credential information (e.g., credential identifiers, access control permissions, credential types, etc.), configuration data, access control schedules, whitelists, blacklists, device parameters, and/or other suitable access control data. In some embodiments, the credential includes, or itself serves as, a credential identifier. Further, as described below, the access control database 110 may identify a set of caveat rules corresponding with one or more (e.g., each) credential type. For example, the set of caveat rules for a particular credential type may identify which actions are authorized to be performed by a credential of that credential type. As such, a credential having a caveat requesting/instructing the access control device 102 to perform an action/function not authorized for that particular credential type may be dismissed as erroneous or nefarious. It should be appreciated that the access control database 110 may be embodied as a database, a table (e.g., an association table), and/or any other data structure or collection of data structures suitable for performing the functions described herein. In some embodiments, the static key 112 is stored to the access control device 102 and the host server 108 and "known" only to those devices. In particular, in some embodiments, the static key 112 may be embodied as a site key corresponding to the particular site of the access control device 102 (e.g., the particular building within which the access control device 102 is located). It should be appreciated that the static key 112 may be used in conjunction, for example, with a one-time use key to prevent replay attacks.

The credential server 104 is configured to generate and/or otherwise assign credentials. As such, in the illustrative embodiment, the credential server 104 may generate a credential for access to the access control device 102 and transmit the credential to the host server 108. For example, as depicted by the credential token 300 of FIG. 3, the credential server 104 may generate the credential 306 and a keyed hash 308 of the credential 306. In particular, in some embodiments, the credential 306 may be encrypted and linked to the host server 108, the mobile device 106, and/or the application 114. For example, in some embodiments, the credential server 104 may generate the credential 306 for a particular host/OEM and thus link the generated credential 306 to that host/OEM. In the illustrative embodiment, the keyed hash 308 is generated using an HMAC hash function using a key associated with the credential server 104 and/or an owner of the credential server 104. However, in other embodiments, another hash function, signature, and/or other suitable function may be used to verify the integrity of the credential 306. It should be appreciated that the credential 306 may be embodied as any type of access credential readable by the access control device 102 in order to make an access control device and for otherwise performing the functions described herein.

The mobile device 106 is configured to wirelessly communicate with the host server 108 and the access control device 102. For example, the mobile device 106 may receive a credential from the host server 108 to be presented to the access control device 102. As shown in FIG. 1, the illustrative mobile device 106 includes an application 114 that provides a user interface for the user to perform various functions. For example, in some embodiments, the application 114 enables the user of the mobile device 106 to add caveats to certain credentials as described herein. The application 114 may be embodied as any suitable application for performing the functions described herein. For example, in some embodiments, the application 114 is embodied as a smartphone application. In some embodiments, it should be appreciated that the application 114 may serve (e.g., in part) as a client-side user interface for a web-based application or service of the host server 108.

As described herein, the host server 108 is configured to receive one or more credentials from the credential server 104 and transmit one or more credentials to the mobile device 106 for presentation to the access control device 102. Further, in the illustrative embodiment, the host server 108 transmits the static key 112 out-of-band to the access control device 102 such that only the host server 108 and the access control device 102 have access to the static key 112. For example, in some embodiments, the static key 112 may be transmitted to the access control device 102 during a commissioning process of the access control device 102. In other embodiments, the credential server 104 may transmit the static key 112 out-of-band to the access control device 102 and separately transmit the static key 112 to the host server 108. For example, the static key 112 may be provisioned to the access control device 102 when the access control device 102 is initially programmed (e.g., during the manufacturing process) and transmitted to the host server 108 when the access control device 102 is conveyed to the host (e.g., when/after the access control device 102 is sold).

In some embodiments, the host server 104 may be configured to manage credentials of the access control system 100. For example, the host server 104 may be responsible for ensuring that the access control device 102 has updated authorized credentials, whitelists, blacklists, device parameters, and/or other suitable data. Additionally, in some embodiments, the host server 104 may receive security data, audit data, raw sensor data, and/or other suitable data from the access control device 102 for management of the access control system 100. In some embodiments, the host server 104 may directly and/or indirectly communicate with multiple access control devices 102 at a single site (e.g., a particular building) and/or across multiple sites. That is, in such embodiments, the host server 104 may be configured to receive data from access control devices 102 distributed across a single building, multiple buildings on a single campus, or across multiple locations.

It should be appreciated that each of the access control device 102, the credential server 104, the mobile device 106, and/or the host server 108 may be embodied as one or more computing devices similar to the computing device 200 described below in reference to FIG. 2. For example, in the illustrative embodiment, each of the access control device 102, the credential server 104, the mobile device 106, and/or the host server 108 includes a processing device 202 and a memory 206 having stored thereon operating logic 208 for execution by the processing device 202 for operation of the corresponding device.

It should be further appreciated that, although the credential server 104 and the host server 108 are described herein as one or more computing devices outside of a cloud computing environment, in other embodiments, one or both of the servers 104, 108 may be embodied as a cloud-based device or collection of devices. Further, in cloud-based embodiments, one or both of the servers 104, 108 may be embodied as a "serverless" or server-ambiguous computing solution, for example, that executes a plurality of instructions on-demand, contains logic to execute instructions only when prompted by a particular activity/trigger, and does not consume computing resources when not in use. That is, the server 104 and/or server 108 may be embodied as a virtual computing environment residing "on" a computing system (e.g., a distributed network of devices) in which various virtual functions (e.g., Lamba functions, Azure functions, Google cloud functions, and/or other suitable virtual functions) may be executed corresponding with the functions of the server 104 and/or server 108 described herein. For example, when an event occurs (e.g., data is transferred to the server 104 and/or server 108 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of particular data is made (e.g., via an appropriate interface to the server 104 or server 108), the appropriate virtual function(s) may be executed to perform the actions before eliminating the instance of the virtual function(s).

Although only one access control device 102, one credential server 104, mobile device 106, and one host server 108 are shown in the illustrative embodiment of FIG. 1, the system 100 may include multiple access control devices 102, credential servers 104, mobile devices 106, and/or host servers 108 in other embodiments. For example, as indicated above, the server 108 may be embodied as multiple servers in a cloud computing environment in some embodiments. Further, the mobile device 106 may communicate with multiple access control device 102 at various points in time.

Figure 2:
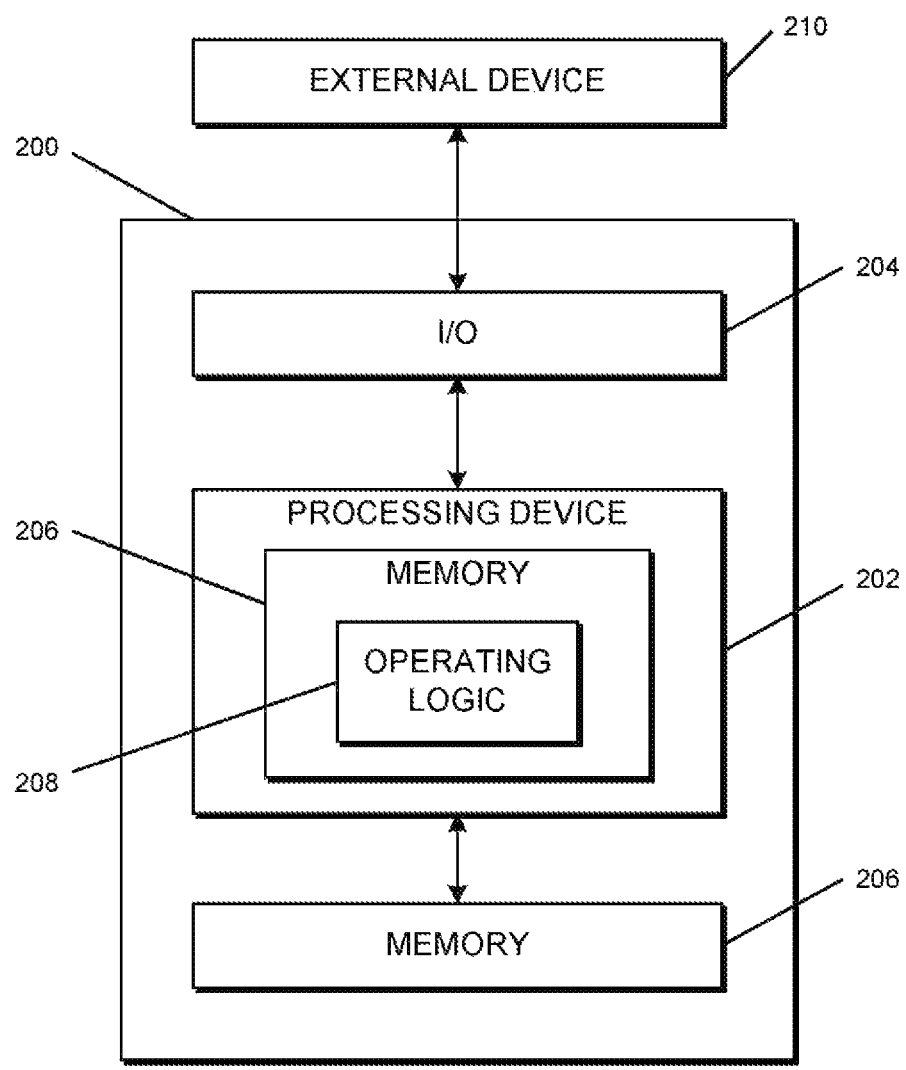
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device 102, credential server 104, mobile device 106, and/or host server 108 illustrated in FIG. 1. Depending on the particular embodiment, the computing device 200 may be embodied as a reader device, access control device, server, desktop computer, laptop computer, tablet computer, notebook, netbook, Ultrabook™, mobile computing device, cellular phone, smartphone, wearable computing device, personal digital assistant, Internet of Things (IoT) device, camera device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the credential server 104, the mobile device 106, and/or the host server 108. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
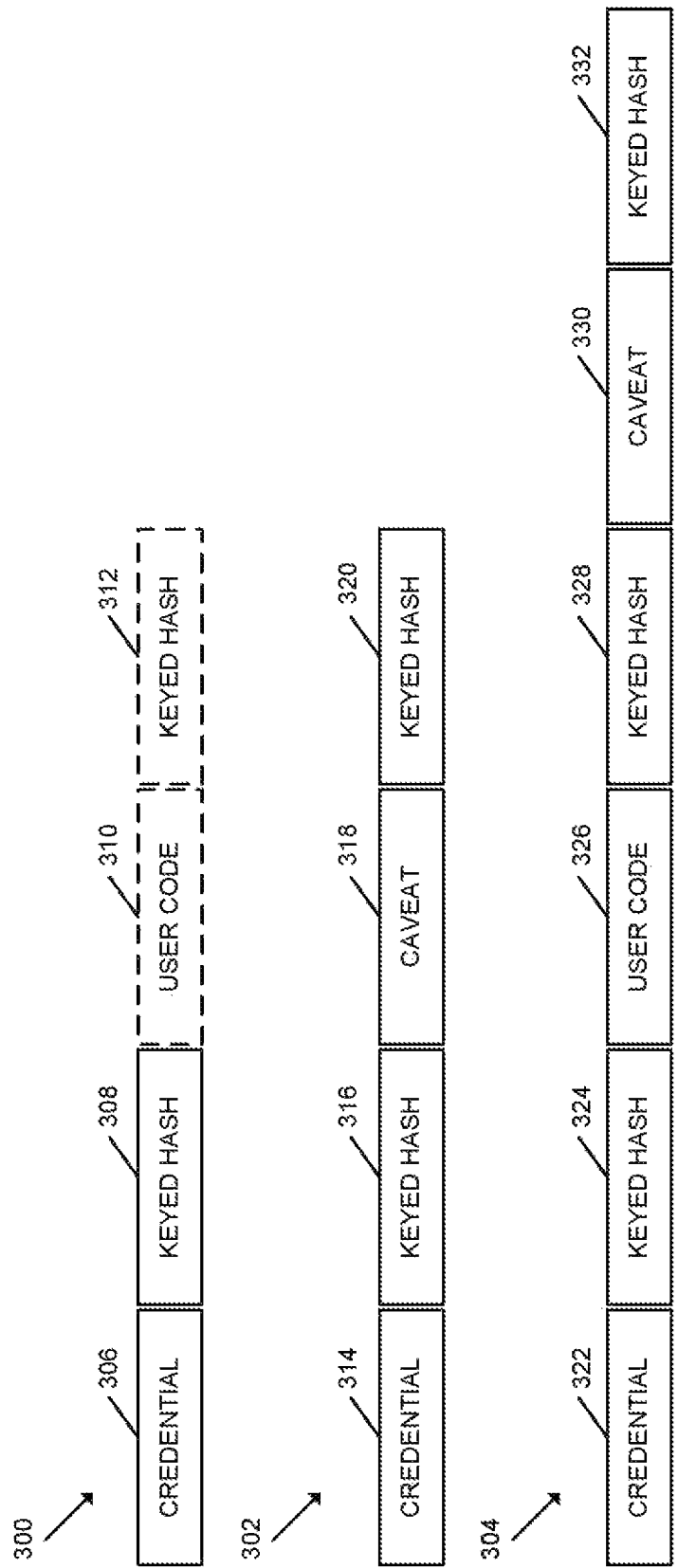
FIG. 3 is a simplified diagram illustrating various embodiments of a credential token.

Referring now to FIG. 3, various embodiments of a credential token 300, 302, 304 that may be transmitted from the mobile device 106 to the access control device 102 are shown. It should be appreciated that each of the credential tokens 300, 302, 304 may be embodied as any suitable data structure for performing the functions described herein. In the illustrative embodiment, each keyed hash 308, 312, 316, 320, 324, 328, 332 is described as being generated using an HMAC hash function. However, it should be appreciated that one or more other hash functions and/or integrity-validating functions may be used in other embodiments.

As described above, the illustrative credential token 300 includes a credential 306 and a keyed hash 308, which may be generated by the credential server 104 and securely transferred out-of-band to other devices (e.g., the host server 108 and/or the mobile device 106). In some embodiments, the credential 306 may be encrypted and linked to the host server 108, the mobile device 106, and/or the application 114. For example, in some embodiments, the credential server 104 may generate the credential 306 for a particular host/OEM and thus link the generated credential 306 to that host/OEM. In the illustrative embodiment, the keyed hash 308 is generated using an HMAC hash function using a key associated with the credential server 104 and/or an owner of the credential server 104. However, in other embodiments, another hash function, signature, and/or other suitable function may be used to verify the integrity of the credential 306. As indicated above, the credential 306 may be embodied as any type of access credential readable by the access control device 102 in order to make an access control device and for otherwise performing the functions described herein.

As shown in FIG. 3, in some embodiments, the credential token 300 may also include a user code 310 and a keyed hash 312 for validating the integrity of the user code 310. In some embodiments, the application 114 executing on the mobile device 106 provides a user interface that permits the user to enter a user code 310 associated with access to an access control device 102. As such, in some embodiments, the mobile device 106 or, more specifically, the application 114 may receive the user code 310, generate the keyed hash 312 based on the user code 310, and generate/construct the credential token 300 to include the credential 306, keyed hash 308, user code 310, and keyed hash 312. Although the user code 310 is described herein as being provided via a user interface of the application 114, it should be appreciated that the user code 310 may be provided using any other suitable mechanism in other embodiments. For example, in some embodiments, the user code 310 may be pre-programmed into the mobile device 106 or the application 114. It should be further appreciated that the user code 310 may be a personal identification number (PIN), password, keyword, and/or other suitable code. In the illustrative embodiment, the keyed hash 312 is generated using an HMAC hash function using the keyed hash 308 of the credential 306 as the key. In other words, the credential token 300 includes "chained" keyed hashes. In some embodiments, the user code 310 may be used by the access control system 100 to impute multiple credential types to a single credential. For example, a specific credential (e.g., the credential 306) and one user code in combination may indicate that the credential is to be treated as a credential of one credential type (e.g., a normal credential), whereas the same specific credential and a different user code in combination may indicate that the credential is to be treated as a credential of a different credential type (e.g., a toggle credential).

It should be appreciated that the credential token 300 does not include any caveats. As such, in the illustrative embodiment, the access control device 102 may interpret the credential token 300 as a typical credential of whatever credential type associated with the credential token 300. However, each of the credential tokens 302, 304 includes a caveat 318, 330 that instructs/requests the access control device 102 to perform an associated action, for example, upon receipt of the credential. Although each of the illustrative credential tokens 302, 304 includes only a single caveat, it should be appreciated that a particular credential token may include multiple caveats (and corresponding keyed hashes) in other embodiments.

The illustrative credential token 302 includes a credential 314 and a keyed hash 320, which may be generated by the credential server 104 and securely transferred out-of-band to other devices (e.g., the host server 108 and/or the mobile device 106) as described above. The credential token 302 also includes a caveat 318 and a keyed hash 320 for validating the integrity of the caveat 318. As indicated above, the caveat 318 instructs/requests the access control device 102 to perform an associated action and, in some embodiments, may be generated by the mobile device 106 in response to a selection by a user of the mobile device 106 via a user interface of the application 114. As such, in some embodiments, the mobile device 106 or, more specifically, the application 114 may generate the keyed hash 320 based on the caveat 318 and generate/construct the credential token 302 to include the credential 314, keyed hash 316, caveat 318, the keyed hash 320. In other embodiments, the keyed hash 320 may be generated by the host server 108 and transmitted to the mobile device 106.

In the illustrative embodiment, it should be appreciated that the key used in generated the keyed hash 320 may vary depending on the credential type of the underlying credential 314. For example, in some embodiments, the keyed hash 320 may be generated (e.g., by the mobile device 106 and/or the application 114) using an HMAC hash function using the keyed hash 320 of the credential 314 as the key if the credential 314 is one credential type, whereas the keyed hash 320 may be generated (e.g., by the host server 108) using an HMAC hash function using the static key 112 (i.e., the secret key stored on the access control device 102 and the host server 108) as the key if the credential 314 is another credential type. In particular, in some embodiments, the keyed hash 320 is generated using the keyed hash 320 of the credential 314 as the key if the credential 314 is a pass-through credential, whereas the keyed hash 320 is generated using the static key 112 as the key if the credential 314 is a normal credential, a toggle credential, a freeze credential, or a one-time use credential.

As described above, the access control system 100 utilizes various credential types, and each of the credential types has a corresponding set of caveat rules that identifies actions authorized for credentials of that credential type when presented to an access control device 102. In some embodiments, the credential types include a normal credential, a toggle credential, a freeze credential, a one-time use credential, and a pass-through credential. Further, in some embodiments, the caveat rules associated with the normal credential type identify no additional authorized actions (other than normal operation of the credential), the caveat rules associated with the toggle credential type identify no additional authorized actions (other than toggle operation of the credential), the caveat rules associated with the freeze credential authorize a lockdown action, the caveat rules associated with the one-time use credential authorize an add user action, a remove user action, and a modify permissions action, and the caveat rules associated with the pass-through credential authorize an add user action, a remove user action, a modify permissions action, a wireless call-in action, a calibrate sensors action, a lockdown action, a toggle action, and a run diagnostics action. It should be appreciated that a freeze credential without the lockdown caveat "freezes" the access control device 102 in its current locked state (i.e., locked or unlocked), whereas a freeze credential with the lockdown caveat places the access control device 102 in a locked state regardless of the current locked state, disables access control schedules, and allows only pass-through credentials access.

The illustrative credential token 304 includes a credential 322, a keyed hash 324, a user code 326, a keyed hash 328, a caveat 330, and a keyed hash 332. It should be appreciated that the credential 322, keyed hash 324, user code 326, and keyed hash 328 of the credential token 302 are similar to the credential 306, keyed hash 308, user code 310, and keyed hash 312 of the credential token 300, respectively. The illustrative credential token 304 also includes a caveat 330 and keyed hash 332, which are similar to the caveat 318 and the keyed hash 320 of the credential token 302, respectively. However, in some embodiments, the keyed hash 332 is generated using an HMAC hash function using the keyed hash 328 of the user code 326 as the key if the credential 314 is of an appropriate credential type as described above (i.e., a credential type not involving the static key 112).

Figure 4:
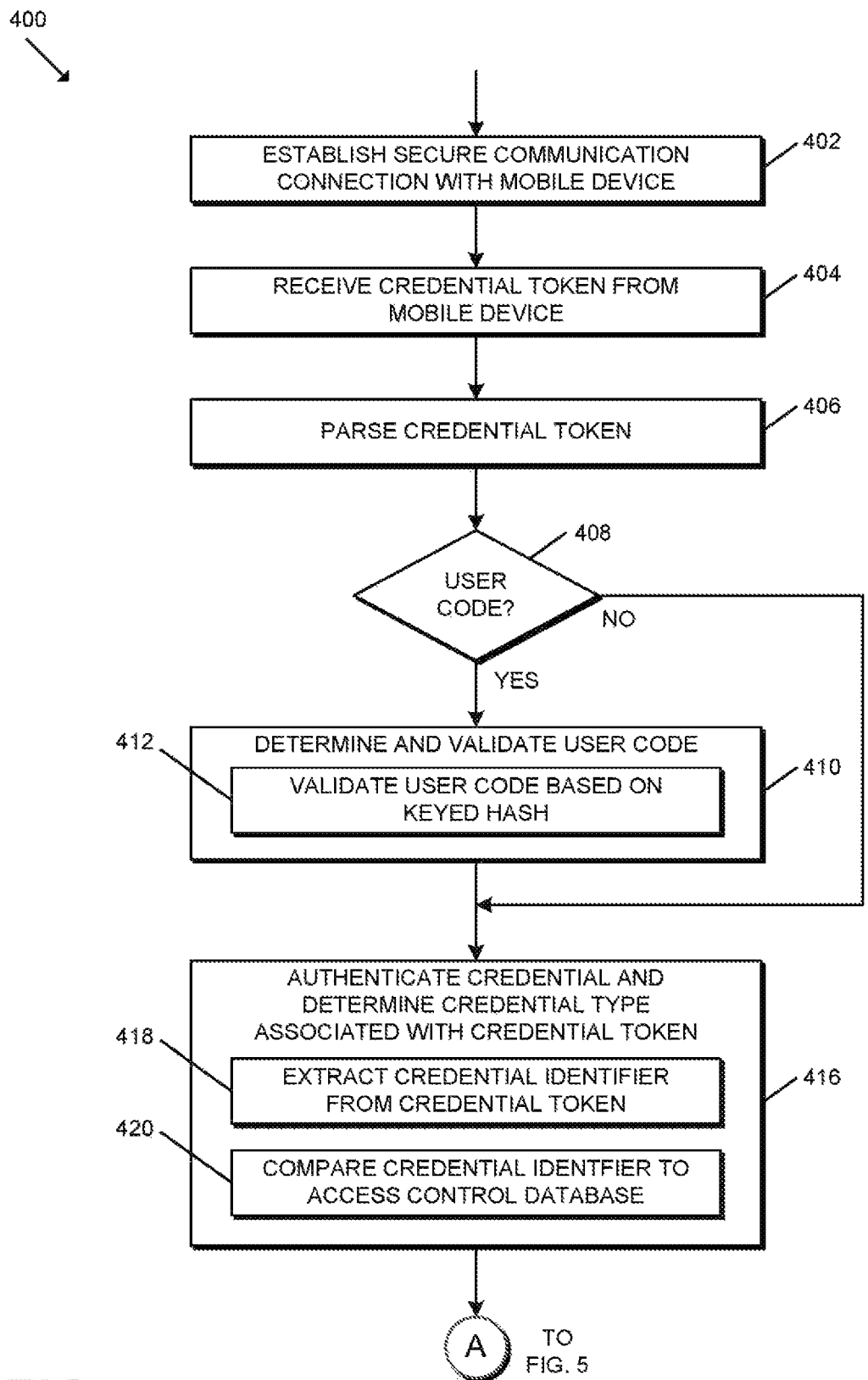
FIGS. 4-5 are a simplified flow diagram of at least one embodiment of a method for utilizing caveats for wireless credential access.
Figure 5:
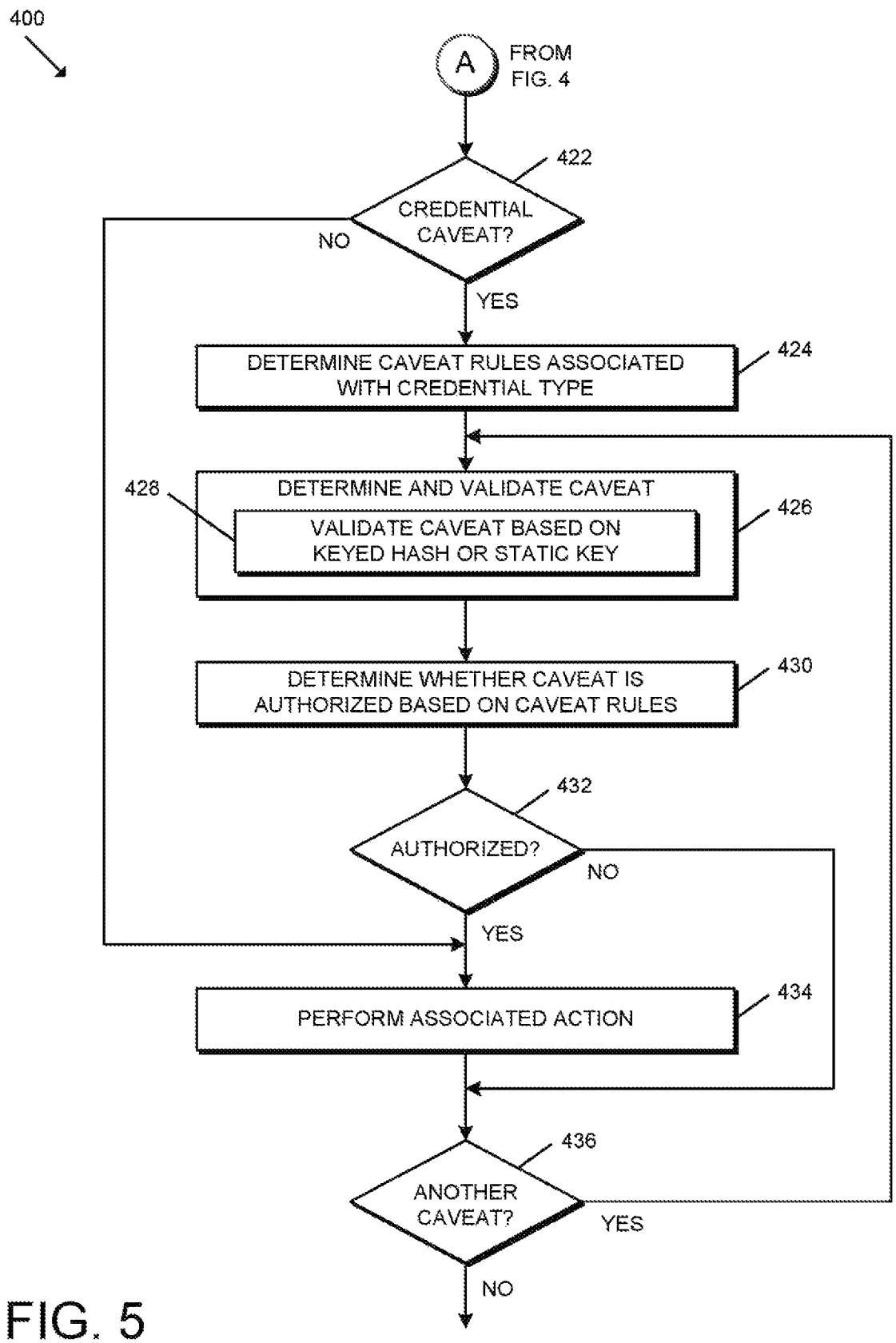

Referring now to FIGS. 4-5, in use, the access control system 100 or, more specifically, the access control device 102 may execute a method 400 for utilizing caveats for wireless credential access. It should be appreciated that the particular blocks of the method 400 are illustrated by way of example, and such blocks may be combined or divided, added or removed, and/or reordered in whole or in part depending on the particular embodiment, unless stated to the contrary. The illustrative method 400 begins with block 402 in which the access control device 102 establishes a secure wireless communication connection with the mobile device 102. For example, in some embodiments, the access control device 102 may transmit Bluetooth® or Bluetooth Low Energy (BLE) advertisement messages, which the mobile device 102 may respond to in order to initiate the communication. In other embodiments, the access control device 102 and the mobile device 102 may otherwise establish a secure wireless communication connection, for example, using a different communication technology and/or protocol (e.g., Wi-Fi, WiMAX, Zigbee, etc.).

In block 404, the access control device 102 receives a credential token from the mobile device 106. As described above, the credential token includes a credential (e.g., including a credential identifier) and a keyed hash of that credential. Further, in some embodiments, the credential token may also include one or more caveats and/or user codes and the corresponding keyed hash(es). In block 406, the access control device 102 may parse the credential token, for example, to identify the credential, user code(s), caveat (s), keyed hashes, credential number, and/or other data included in the credential token for extraction/processing by the access control device 102.

In block 408, the access control device 102 determines whether the credential token includes a user code. If not, the method 400 advances to block 416. However, if the credential token does include a user code, the access control device 102 may process that user code. For example, in block 410, the access control device 102 determines the user code and validates the integrity of the user code. In particular, in block 412, the access control device 102 may validate the user code based on the keyed hash associated with the user code as described above. Specifically, the access control device 102 may regenerate that hash and compare the generated hash to the stored keyed hash.

In block 416, the access control device 102 authenticates the credential and determines the credential type of the credential (i.e., the credential type associated with the credential token). In doing so, the access control device 102 may extract/retrieve the credential identifier from the credential token in block 418 and compare the credential identifier to the access control database 110 stored on the access control device 102 in block 420. That is, in some embodiments, the access control database 110 includes data that identifies the credential type of particular credentials. For example, the credential type may be expressly identified in the access control database 110, the credential type may be inherent in the representation of the credential itself, and/or the credential type may be otherwise identified/determinable. As described above, the credential may be authenticated based on the keyed hash (e.g., HMAC) and/or signature and key associated with the credential server 104. Further, the access control device 102 confirms that the credential identifier matches one stored in the access control database 110 granting the credential access rights. If the credential identifier does not match, or the keyed hash does not match, the access control device 102 may ignore the credential, generate an audit message, generate an alert, and/or otherwise respond to the error depending on the particular embodiment.

In block 422 of FIG. 5, the access control device 102 determines whether the credential token includes one or more caveats. If not, the method 400 advances to block 434 in which the access control device 102 performs an action associated with the credential type. For example, a normal credential causes a normal operation of the access control device 102 (e.g., lock-to-unlock or unlock-to-lock), and a freeze credential causes the access control device 102 to remain in its current state as described above. However, if the access control device 102 determines in block 422 that the credential token includes at least one caveat, the method 400 advances to block 424 in which the access control device 102 determines the set of caveat rules associated with the credential type of the credential. As indicated above, in some embodiments, the caveat rules may be stored in the access control database 110 and identify any actions authorized for a credential of the corresponding credential type.

In block 426, the access control device 102 determines/retrieves the caveat and validates the integrity of the caveat. In particular, in block 428, the access control device 102 may validate the caveat based on the keyed hash associated with the caveat or the static key 112 depending on the credential type as described in greater detail above. It should be appreciated that, in embodiments including multiple caveats, the access control device 102 may select one of the caveats for processing using any suitable technique. For example, in some embodiments, multiple caveats may be processed according to a predefined order. If the caveat is not valid (e.g., the keyed hash does not match), the access control device 102 may ignore the caveat, ignore the entire credential, generate an audit message, generate an alert, and/or otherwise respond to the error depending on the particular embodiment.

In block 430, the access control device 102 determines whether the caveat is authorized based on the caveat rules associated with the credential type. As such, the access control device 102 confirms that the caveat is within scope of the perceived authority of the credential. If the access control device 102 determines in block 432 that the caveat is authorized, the method 400 advances to block 434 in which the access control device 102 may perform the action associated with the caveat. Depending on the particular embodiment, the access control device 102 may perform the caveat-based action in addition to, or in the alternative to, an action associated with the credential type itself. If, in block 432, the access control device 102 determines that the caveat is not authorized based on the caveat rules, the access control device 102 may ignore the caveat, ignore the entire credential, generate an audit message, generate an alert, and/or otherwise respond to the error depending on the particular embodiment. In block 436, the access control device 102 determines whether the credential token includes another caveat to be processed. If so, the method 400 returns to block 426 in which the access control device 102 determines/validates another caveat, which may be selected accordingly to any suitable technique.

Although the blocks 402-436 are described in a relatively serial manner, it should be appreciated that various blocks of the method 400 may be performed in parallel in some embodiments.

What is claimed is:

1. A method for utilizing caveats for wireless credential access, the method comprising:
    receiving, by an access control device, a credential token from a mobile device, wherein the credential token includes an access credential and a caveat that instructs the access control device to perform an associated action;
    determining, by the access control device, a credential type associated with the access credential based on the credential token;

determining, by the access control device, a set of caveat rules associated with the credential type, wherein the set of caveat rules identifies one or more actions authorized for an access credential of the credential type;

validating, by the access control device, the caveat using an integrity-validating function based on data included in the credential token; and performing, by the access control device, the associated action identified by the caveat in response to a determination that the associated action is an action authorized by the set of caveat rules associated with the credential type, and wherein the associated action identified by the caveat is performed in addition to a standard action associated with the credential type.

2. The method of claim 1, wherein the integrity-validating function comprises a hash function.

3. The method of claim 1, wherein the integrity-validating function comprises a digital signature.

4. The method of claim 1, wherein the credential token further includes a user code; and wherein determining the credential type comprises determining the credential type associated with the access credential based on the user code.

5. The method of claim 4, wherein the access credential is determined to be of a first credential type if the user code is a first user code and of a second credential type if the user code is a second user code.

6. The method of claim 1, further comprising ignoring, by the access control device, the caveat in response to a determination that the associated action is an action not authorized by the set of caveat rules associated with the credential type.

7. An access control device for utilizing caveats for wireless credential access, the access control device comprising:

a processor; and a memory comprising an access control database and a plurality of instructions stored thereon that, in response to execution by the processor, causes the access control device to:

receive a credential token from a mobile device, wherein the credential token includes an access credential and a caveat that instructs the access control device to perform an associated action;

determine a credential type associated with the access credential based on the credential token;

determine a set of caveat rules associated with the credential type, wherein the set of caveat rules identifies one or more actions authorized for an access credential of the credential type;

validate the caveat using an integrity-validating function based on data included in the credential token; and perform the associated action identified by the caveat in response to a determination that the associated action is an action authorized by the set of caveat rules associated with the credential type, and wherein the associated action identified by the caveat is performed in addition to a standard action associated with the credential type.

8. The access control device of claim 7, wherein the integrity-validating function comprises a hash function.

9. The access control device of claim 7, wherein the integrity-validating function comprises a digital signature.

10. The access control device of claim 7, wherein the plurality of instructions further causes the access control device to ignore the caveat in response to a determination that the associated action is an action not authorized by the set of caveat rules associated with the credential type.

11. An access control system, comprising:

a mobile device;

a host server configured to receive an access credential from a credential server and transmit the access credential to the mobile device; and an access control device comprising a memory having an access control database stored thereon, wherein the access control device is configured to:

update the access control database based on access control data received from the host server, wherein the access control data identifies the access credential;

receive a credential token from the mobile device, wherein the credential token includes the access credential and a caveat that instructs the access control device to perform an associated action;

determine a credential type associated with the access credential based on the credential token;

determine a set of caveat rules associated with the credential type, wherein the set of caveat rules identifies one or more actions authorized for an access credential of the credential type;

validate the caveat using an integrity-validating function based on data included in the credential token; and perform the associated action identified by the caveat in response to a determination that the associated action is an action authorized by the set of caveat rules associated with the credential type, and wherein the associated action identified by the caveat is performed in addition to a standard action associated with the credential type.

12. The access control system of claim 11, wherein the mobile device is offline when interacting with the access control device.

13. The access control system of claim 11, wherein the integrity-validating function comprises a hash function.

14. The access control system of claim 11, wherein the integrity-validating function comprises a digital signature.

15. The access control system of claim 11, wherein the associated action identified by the caveat is performed in addition to the standard action associated with the credential type.

16. The access control system of claim 11, wherein the associated action identified by the caveat is performed in the alternative to the standard action associated with the credential type.

17. The method of claim 1, wherein the set of caveat rules associated with a one-time use credential type identifies an add user action, a remove user action, and a modify permissions action as authorized actions.

18. The method of claim 1, wherein the set of caveat rules associated with a pass-through credential type identifies one or more of an add user action, a remove user action, a modify permissions action, a wireless call-in action, a calibrate sensors action, a lockdown action, a toggle action, and a run diagnostics action as authorized actions.

19. The method of claim 1, wherein the set of caveat rules associated with the caveat type identifies one or more of an add user action, a remove user action, a modify permissions action, a wireless call-in action, a calibrate sensors action, a lockdown action, a toggle action, and a run diagnostics action as authorized actions.

* * * * *